United States Patent [19]

Ooka

[11] Patent Number: 4,518,070
[45] Date of Patent: May 21, 1985

[54] CLUTCH RELEASE APPARATUS FOR CHANGE SPEED TRANSMISSION

[75] Inventor: Yuzo Ooka, Tokyo, Japan

[73] Assignee: Honda Giken Kogyo Kabushiki Kaisha, Tokyo, Japan

[21] Appl. No.: 387,280

[22] Filed: Jun. 10, 1982

[30] Foreign Application Priority Data

Jun. 23, 1981 [JP] Japan .................. 56-96023

[51] Int. Cl.³ .............. F16D 25/08; F16H 5/12; B60K 23/02
[52] U.S. Cl. .................. 192/85 CA; 192/91 A; 192/96
[58] Field of Search .............. 192/91 A, 96, 85 CA

[56] References Cited

U.S. PATENT DOCUMENTS

| | | | |
|---|---|---|---|
| 2,412,331 | 12/1946 | Green | 192/96 X |
| 2,969,052 | 1/1961 | Randoz | 192/91 A |
| 3,283,866 | 11/1966 | Giacosa | 192/96 |
| 3,848,852 | 11/1974 | Therkildsen | 192/91 A X |
| 3,915,433 | 10/1975 | Therkildsen | 192/91 A X |
| 4,030,575 | 6/1977 | Moring et al. | 192/91 A X |
| 4,287,977 | 9/1981 | Haga et al. | 192/91 A |

FOREIGN PATENT DOCUMENTS

| | | | |
|---|---|---|---|
| 0609931 | 10/1960 | Canada | 192/96 |
| 2924234 | 4/1980 | Fed. Rep. of Germany | 192/96 |

OTHER PUBLICATIONS

Shop Manual entitled "Honda 450 Super Sports Model CB-450" of Honda Motor Co., Ltd., 1966.
Article from German Publication, Motorrad, Jun. 1981, pp. 20–22.

Primary Examiner—Rodney H. Bonck
Assistant Examiner—David D. House
Attorney, Agent, or Firm—Lyon & Lyon

[57] ABSTRACT

A push rod extends through the main shaft of a change speed gear transmission to release a friction clutch on that shaft. The other end of the push rod is engaged by a hydraulic actuator. An oil seal assembly for the push rod is prevented from being damaged by leakage of hydraulic oil, and this is accomplished by means of an air gap and vent between the hydraulic actuator and the oil seal assembly.

8 Claims, 4 Drawing Figures

CLUTCH RELEASE APPARATUS FOR CHANGE SPEED TRANSMISSION

This invention relates to a change speed gear transmission for delivering power from an internal combustion engine to an output shaft. The invention finds particular usefulness in connecting a motorcycle engine to the final drive shaft for the rear wheel.

It is highly desirable to employ a friction clutch for driving the change speed gear transmission from the engine crank shaft, and it is also desirable to employ the same lubricating oil for the engine, change speed transmission, and friction clutch. However, in order to operate the friction clutch it is desirable to employ a hydraulic actuator having a piston and cylinder. A push rod extends axially through the interior of a main shaft of the change speed gear transmission and this push rod engages an element of the friction clutch at one end and is caused to move axially by means of the hydraulic actuator at the other end.

A seal ring assembly is mounted on the housing for the change speed gear transmission and, in accordance with this invention, means are provided to prevent leaking of hydraulic oil from the hydraulic actuator from damaging the seal ring assembly. The hydraulic oil often has properties which are quite different from the lubricating oil within the change speed gear transmission, and therefore leakage of hydraulic oil may damage the oil seal assembly for the push rod. This is prevented by interposing an air barrier between said hydraulic actuator and the oil seal assembly. The air barrier has a vent open to atmosphere.

Other and more detailed objects and advantages will appear hereinafter.

Figure 1:
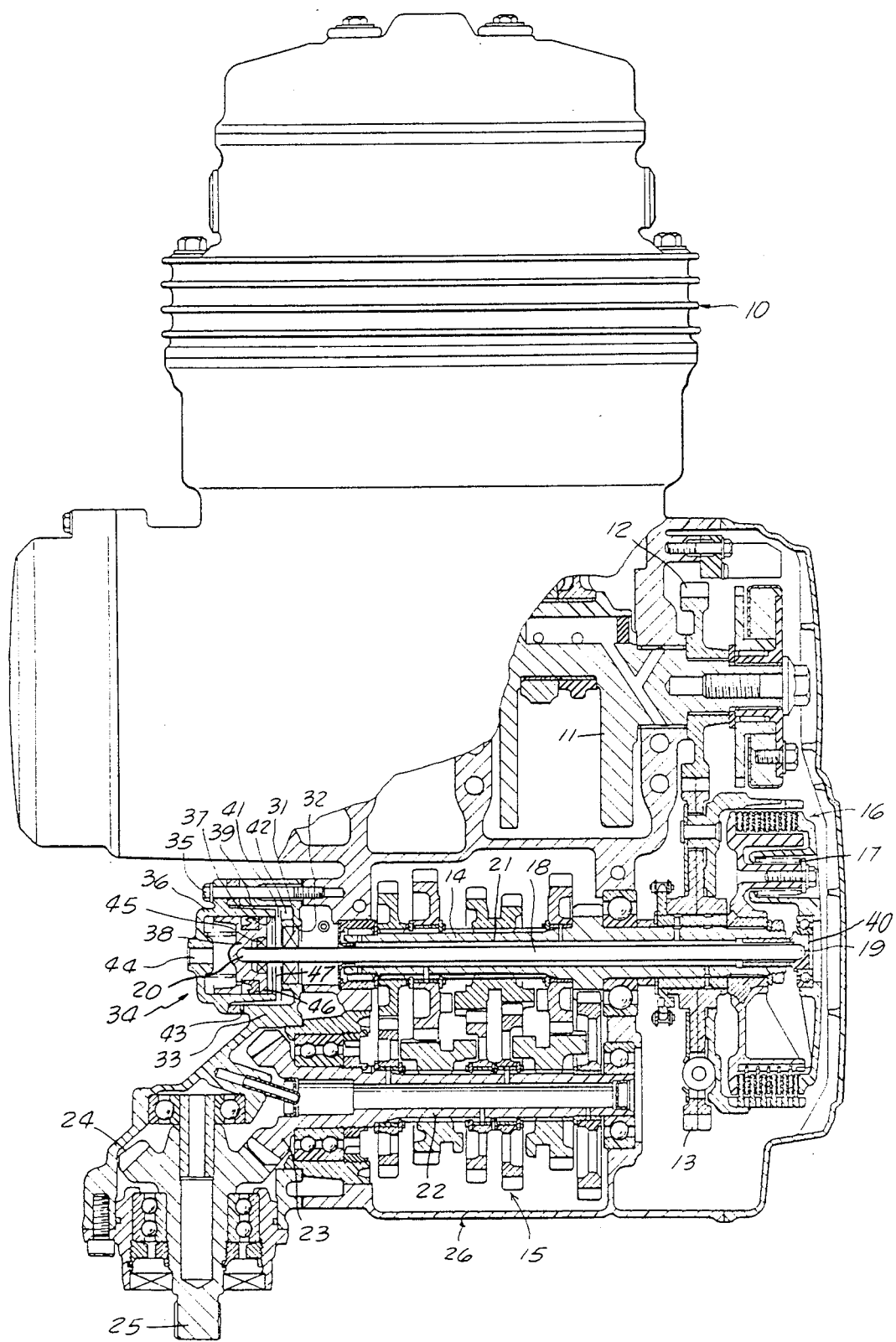
FIG. 1 is a front elevation of a V-type motorcycle engine partly broken away to show the change speed transmission and clutch operating mechanism constituting a preferred embodiment of this invention.
Figure 2:
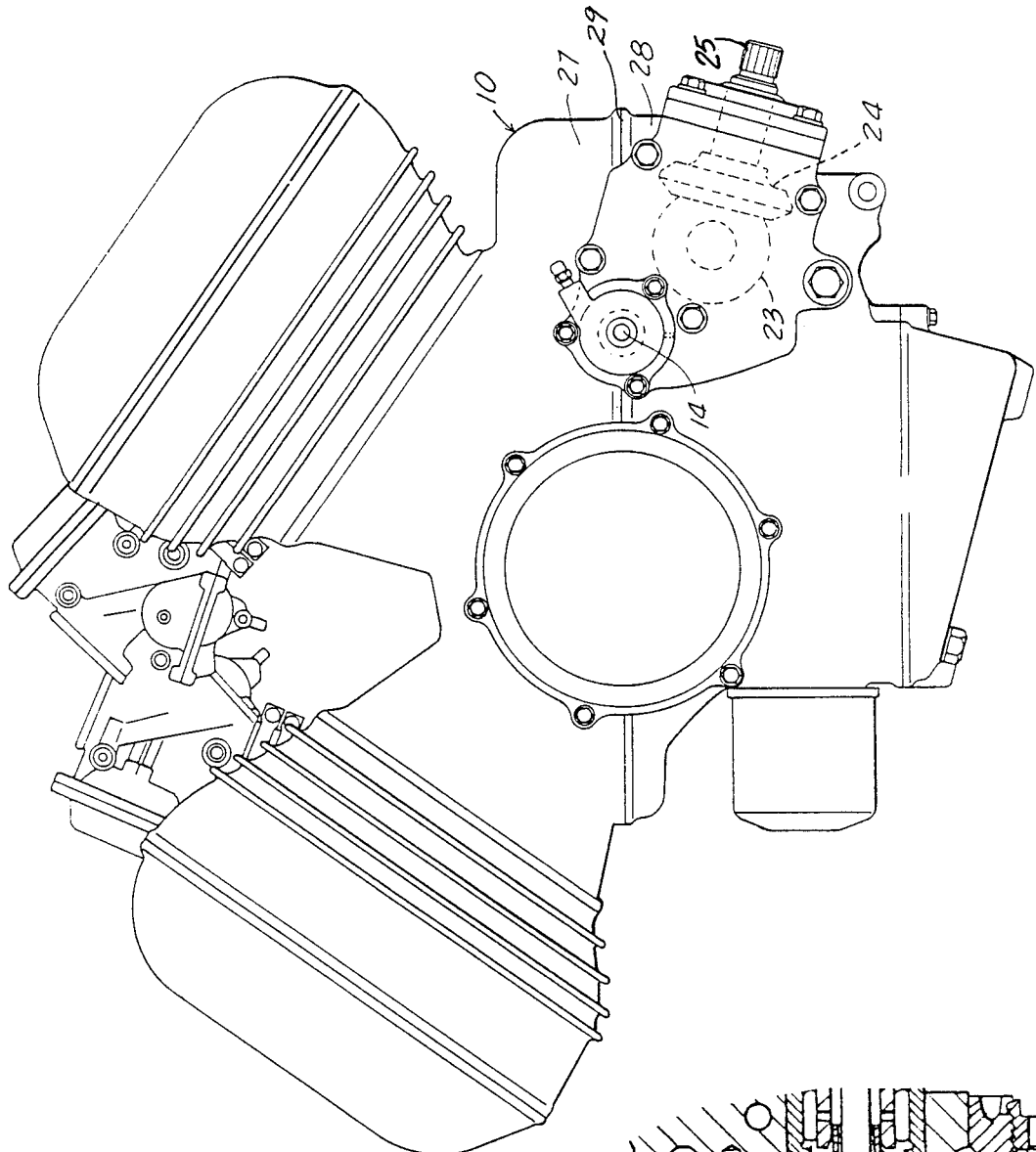
FIG. 2 is a side elevation.
Figure 1A:
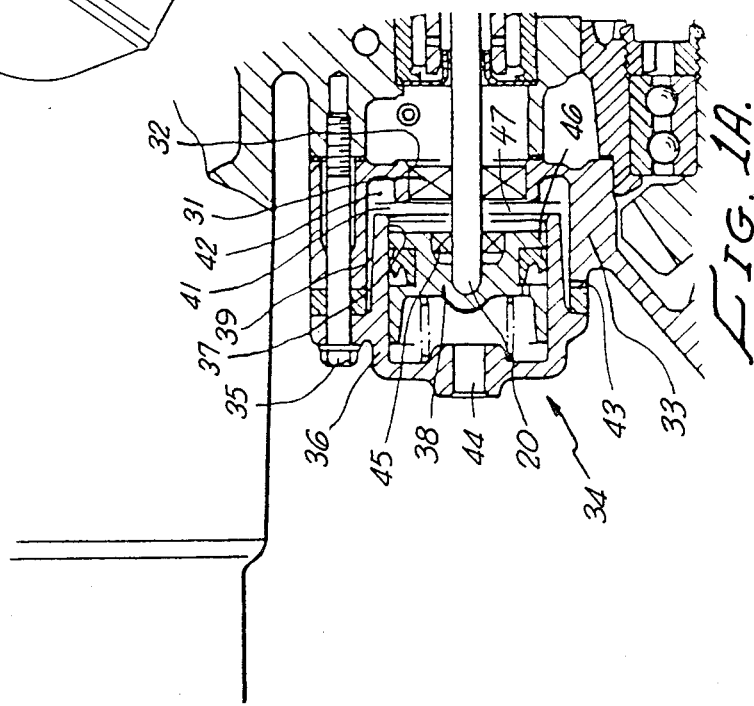
FIG. 1a is an enlarged view of the clutch release apparatus of FIG. 1.

Referring to the drawings, the motorcycle engine generally designated 10 is provided with a crank shaft 11 which extends transversely to the direction of travel of the motorcycle. A driving gear 12 fixed to the crank shaft meshes with a driven gear 13 mounted to turn on the main shaft 14 of the change speed gear transmission 15. A plate type friction clutch 16 is provided for connecting the driven gear 13 in driving relationship with the main shaft 14. A plurality of compression springs 17 serve to close the clutch 16, and a push rod 18 is provided to open the clutch 16.

The push rod 18 is rounded at both ends 19 and 20 and extends through the central axial opening 21 in the main shaft 14. The change speed gear transmission 15 provides a plurality of speed ratios between the main shaft 14 and the line shaft 22. A bevel gear 23 formed integrally with the line shaft 22 meshes with the bevel gear 24 formed integrally on the output shaft 25.

The change speed gear transmission 15 including the friction clutch 16 is contained within a stationary housing 26 formed of two halves 27 and 28 which meet on a junction line 29 to clamp the shafts 11 and 14 between them. The push rod 18 slides through an oil seal assembly 31 contained in a bore 32 provided in the ring member 33. This ring member forms an end wall barrier for the change speed gear transmission 15 and also provides support for the hydraulic actuator assembly 34 and the output shaft 25. Bolts 35 secure the ring member 33 in position on the housing 26.

The hydraulic actuator assembly 34 includes a stationary cylinder element 36 having a bore 37 slidably receiving a piston 38. Clearance space 39 is provided around the outer portion of the cylinder element 36 and within the ring member 33, and this clearance space 39 as well as the interior spaces 41 and 42 all communicate with the vent opening 43. Hydraulic oil under pressure enters the hydraulic actuator assembly 34 through the central opening 44. Hydraulic pressure from the opening 44 acts on the piston 38 to move the push rod 18 toward the right, as viewed in FIG. 1, to cause the push rod 18 to act on the thrust element 40 to open the clutch 16 against the action of the springs 17. This disconnects the main shaft 14 from the crank shaft 11. A seal 45 retains grease for the rod end 20.

It will be understood that the oil seal assembly 31 has sliding contact with the push rod 18 so that hydraulic oil acting against the piston 38 is prevented from causing swelling of the oil seal assembly 31, and is prevented from mixing with the lubricating oil contained within the housing 26 for the change speed gear transmission 15. Leakage past the piston 38 and its seal ring 46 is vented through the spaces 39, 41 and 42, and the vent opening 43, constituting an air gap 47 between the piston 38 and the oil seal assembly 31.

Figure 3:
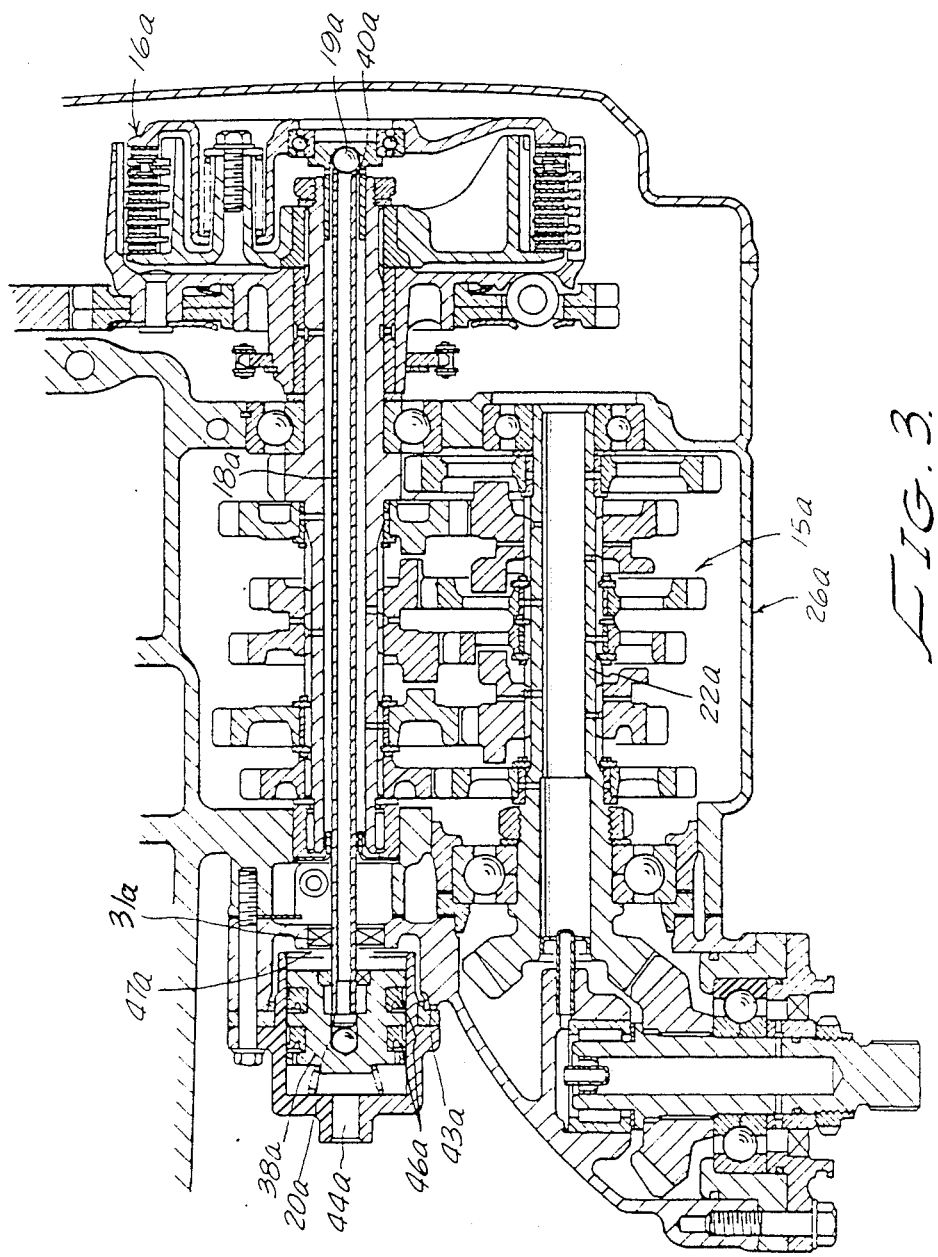
FIG. 3 is a section view similar to the sectioned portion of FIG. 1, and showing a modification.

In the modified form of the invention shown in FIG. 3, parts similar to those previously described are identified by the same number with the added suffix "a". The rounded ends 19 and 20 of the push rod 18 are replaced by spherical balls 19a and 20a mounted in the thrust element 40a and the piston 38a. The piston is provided with two seal rings 46a instead of a single seal ring. The air gap 47a and the vent opening 43a are preserved. Accordingly, hydraulic oil for the actuator 34a does not cause swelling and damage of the oil seal assembly 31a.

Having fully described my invention, it is to be understood that I am not to be limited to the details herein set forth but that my invention is of the full scope of the appended claims.

I claim:

1. A change speed gear transmission, clutch and clutch actuator device for an internal combustion engine having a crankshaft and the combination of a main shaft and a line shaft, comprising:
   gear means for driving said line shaft at a plurality of speed ratios from said main shaft,
   means for driving said main shaft from the crankshaft including the clutch at one end of said main shaft,
   a push rod extending axially through the interior of said main shaft and operable to release said clutch,
   the hydraulic actuator device at the other end of said main shaft for moving said push rod to release said clutch,
   a ring member portion of said change speed gear transmission having a cavity for accepting said hydraulic actuator device, said cavity formed with a sidewall and having a bore in an end wall,
   a seal ring assembly slidably receiving said push rod and positioned in said bore between said change speed gear transmission and said hydraulic actuator device, a cylinder housing for said hydraulic actuator device sized to fit within said cavity and having an outer wall spaced from an inner wall of the cavity to provide an air space therebetween, said hydraulic actuator device having an open end of said cylinder housing spaced from the end wall of said ring member portion, means including a vent opening for forming an air barrer between said hydraulic actuator device and said seal ring assembly, said vent opening being between said inner wall of said cavity and said outer wall of said cylinder housing whereby any leakage of hydraulic fluid exits said vent opening and does not damage said transmission and seal ring assembly, attachment means detachably retaining said hydraulic actuator in said cavity, and output means for delivering power from said line shaft.

2. The combination of claim 1 wherein
said attachment means includes a flange at an open end of said cavity and a complementary flange extending from the sidewall of said outer wall of said cylinder housing.

3. The combination of claim 1 wherein said cylinder housing outer wall tapers; the diameter of the outer wall of the cylinder housing decreases towards the open end.

4. The combination of claim 1 wherein said hydraulic actuator device further includes,
a piston positioned within said hydraulic actuator device, at least two seal grooves in said piston, and a sealing means within each of said grooves.

5. The change speed gear transmission defined in claim 1 wherein said push rod includes flat ends and further includes
a ball member positioned between the one end of the push rod and the hydraulic actuator device and
a ball member positioned between the other end of the push rod and the clutch.

6. A change speed gear transmission, clutch and clutch actuator device for an internal combustion engine having a crankshaft and the combination of a main shaft and a line shaft, comprising:
gear means for driving said line shaft at a plurality of speed ratios from said main shaft,
a housing for said change speed gear transmission,
means for driving said main shaft from the crankshaft including the clutch at one end of said main shaft,
a push rod extending axially through the interior of said main shaft and operable to release said clutch,
a hydraulic actuator device mounted at the other end of said main shaft and outside said housing for moving said push rod to release said clutch, said hydraulic actuator device including a cylinder housing have a cooperating piston and cylinder means defining a hydraulic chamber between them, a ring shaped recess in the transmission housing for partially enclosing said hydraulic actuator device,
said cylinder housing being positioned within said recess to retain a surrounding air space therebetween, a seal ring assembly slidably receiving said push rod and positioned between said change speed gear transmission and said hydraulic actuator device, a vent opening in said ring shaped recess for venting an air barrier which is formed between said hydraulic actuator device and said seal ring assembly to prevent oil leakage from said hydraulic chamber from damaging said seal ring assembly, a flange at an open end of said cavity and a complementary flange on said cylinder housing for attaching said hydraulic actuator device to the transmission housing,
and output means for delivering power from said line shaft.

7. The combination set forth in claim 6 in which said clutch is a plate type friction clutch mounted within said transmission housing.

8. A change speed gear transmission, plate type friction clutch and clutch actuator device for an internal combustion engine having a crankshaft and the combination of a main shaft and a line shaft, comprising:
gear means within said transmission for driving said line shaft at a plurality of speed ratios from said main shaft,
means for driving said main shaft from the crankshaft including the plate type friction clutch at one end of said main shaft,
a push rod extending axially through the interior of said main shaft and operable to release said friction clutch,
the hydraulic actuator device at the other end of said main shaft for moving said push rod to release said friction clutch, said hydraulic actuator device including a cylinder housing having a cooperating piston and cylinder defining a hydraulic chamber between them,
a transmission housing having a cavity for accepting said hydraulic actuator device, said cylinder housing positioned within said transmission housing cavity with an air space between inside walls of the cavity and outside walls of the hydraulic actuator device,
a seal ring assembly slidably receiving said push rod and positioned between said change speed gear transmission and said hydraulic actuator device,
a vent opening from said cavity, said vent opening forming an air barrier between said hydraulic actuator device and said seal ring assembly to prevent oil leakage from said hydraulic chamber from damaging said seal ring assembly,
attachment means detachably retaining said hydraulic actuator in said cavity,
and an output shaft connected to receive power from said line shaft.

* * * * *

UNITED STATES PATENT AND TRADEMARK OFFICE
CERTIFICATE OF CORRECTION

PATENT NO. : 4,518,070
DATED : May 21, 1985
INVENTOR(S) : YUZO OOKA

It is certified that error appears in the above—identified patent and that said Letters Patent is hereby corrected as shown below:

In column 3, line 58, delete "have" and insert therefor -- having --.

Signed and Sealed this

Twenty-fourth Day of September 1985

[SEAL]

Attest:

Attesting Officer

DONALD J. QUIGG

Commissioner of Patents and Trademarks—Designate